A. H. HOFFMAN.
CHARGING REGULATOR FOR STORAGE BATTERIES.
APPLICATION FILED MAY 1, 1916.

1,273,490.

Patented July 23, 1918.
8 SHEETS—SHEET 1.

Witnesses:

Inventor:
Arthur H. Hoffman,

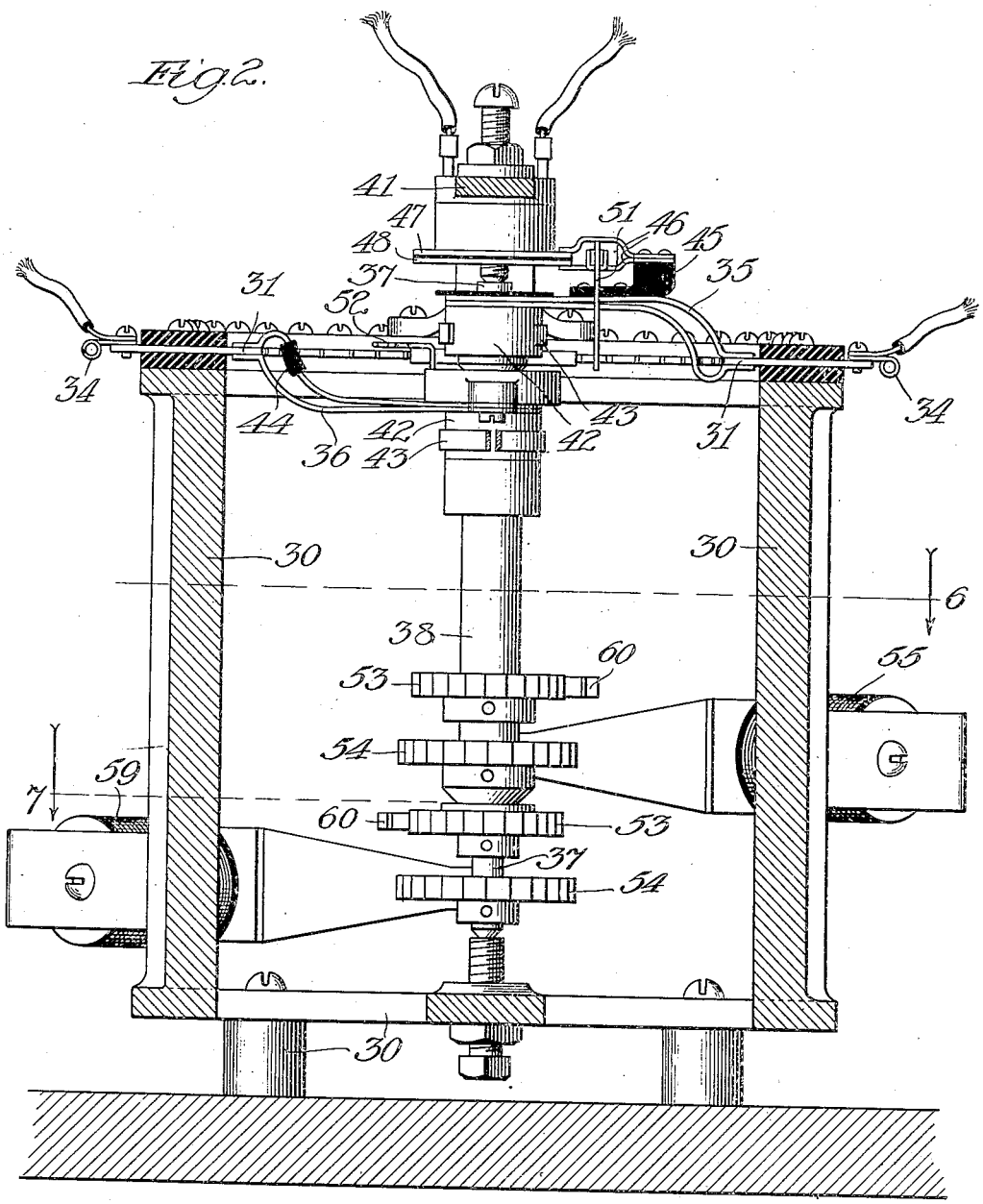

A. H. HOFFMAN.
CHARGING REGULATOR FOR STORAGE BATTERIES.
APPLICATION FILED MAY 1, 1916.
1,273,490.
Patented July 23, 1918.
8 SHEETS—SHEET 3.
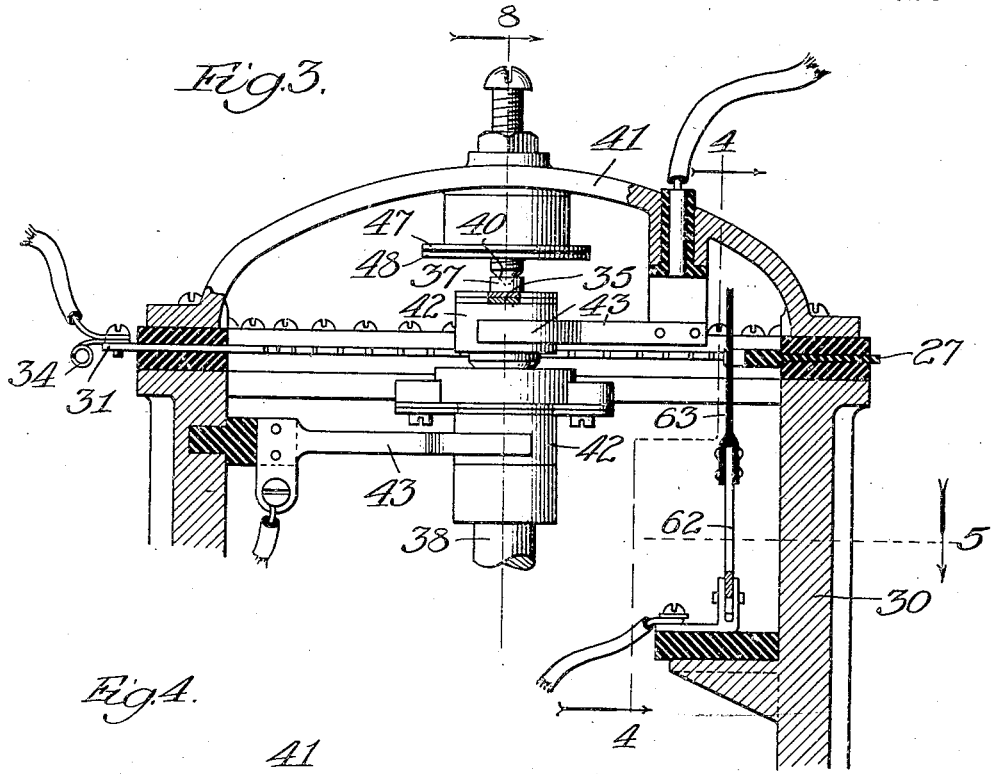
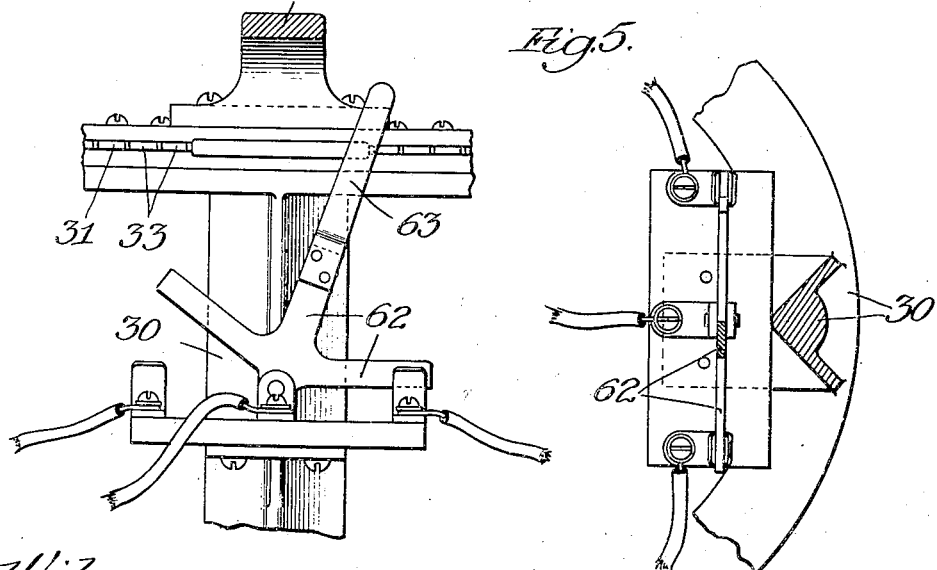
Witnesses:
Inventor:
Arthur H. Hoffman A. H. HOFFMAN.
CHARGING REGULATOR FOR STORAGE BATTERIES.
APPLICATION FILED MAY 1, 1916.
1,273,490.
Patented July 23, 1918.
8 SHEETS—SHEET 4.
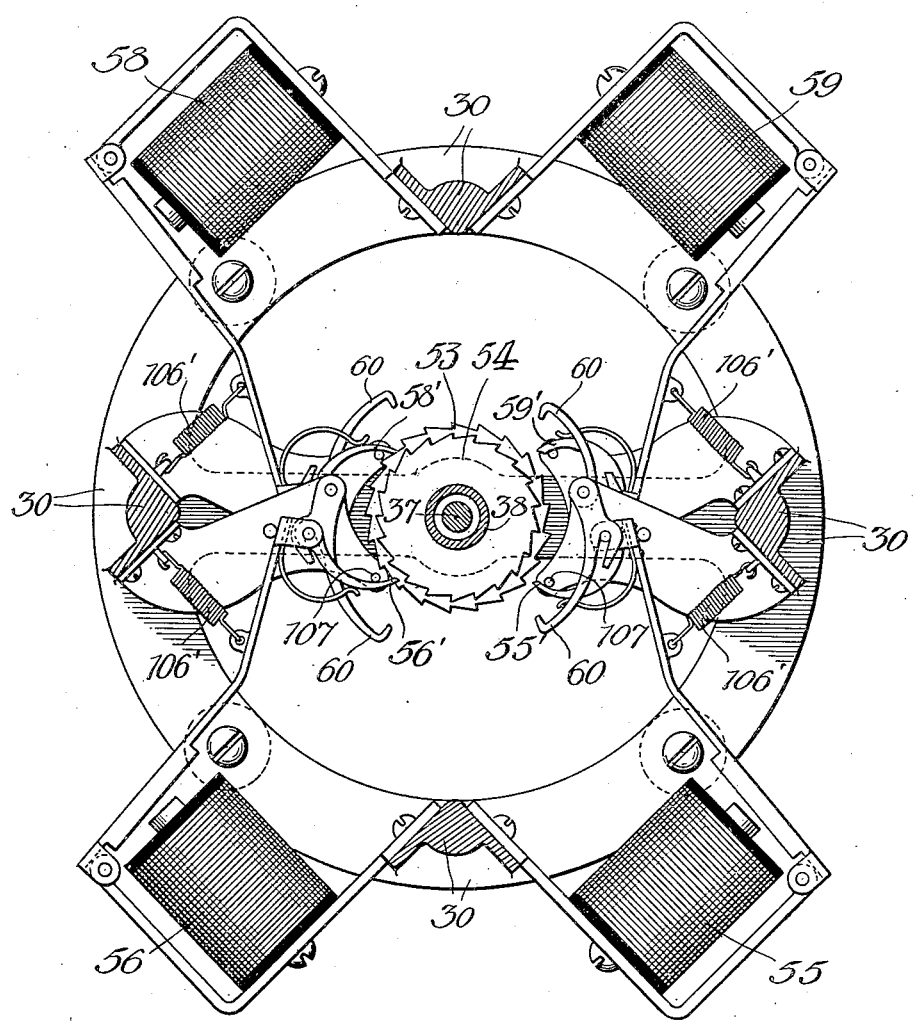

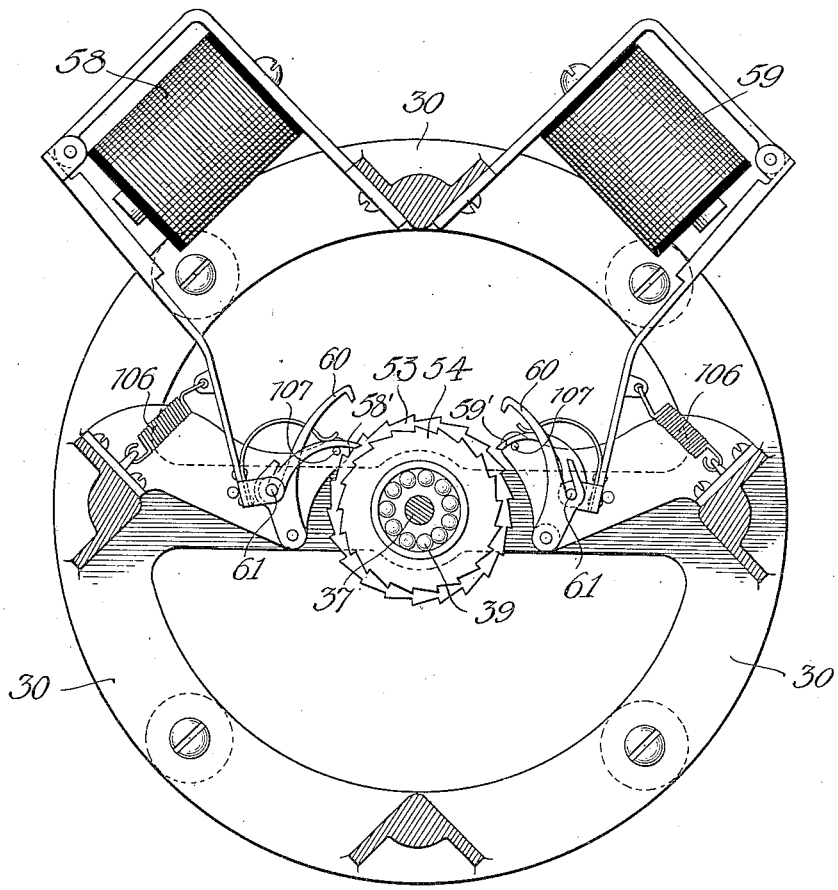

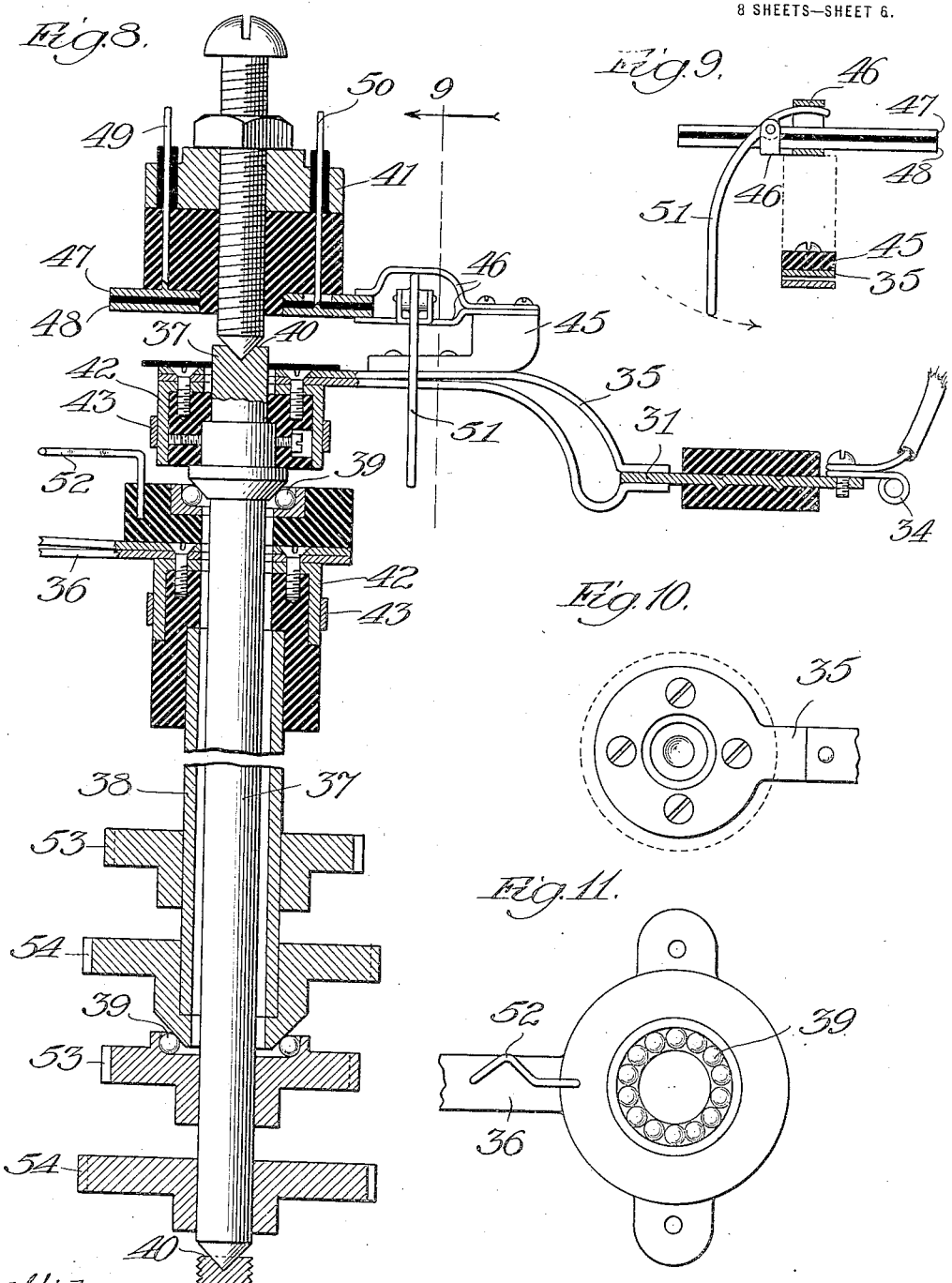

A. H. HOFFMAN.
CHARGING REGULATOR FOR STORAGE BATTERIES.
APPLICATION FILED MAY 1, 1916.
1,273,490.
Patented July 23, 1918.
8 SHEETS—SHEET 7.
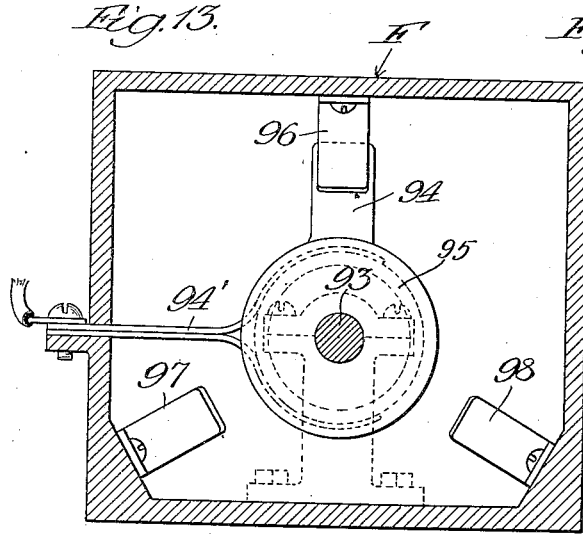
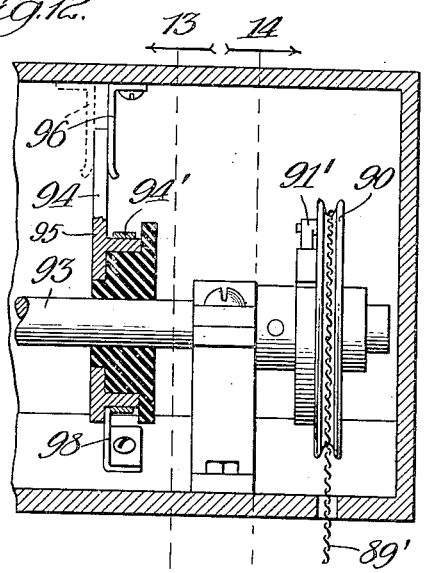
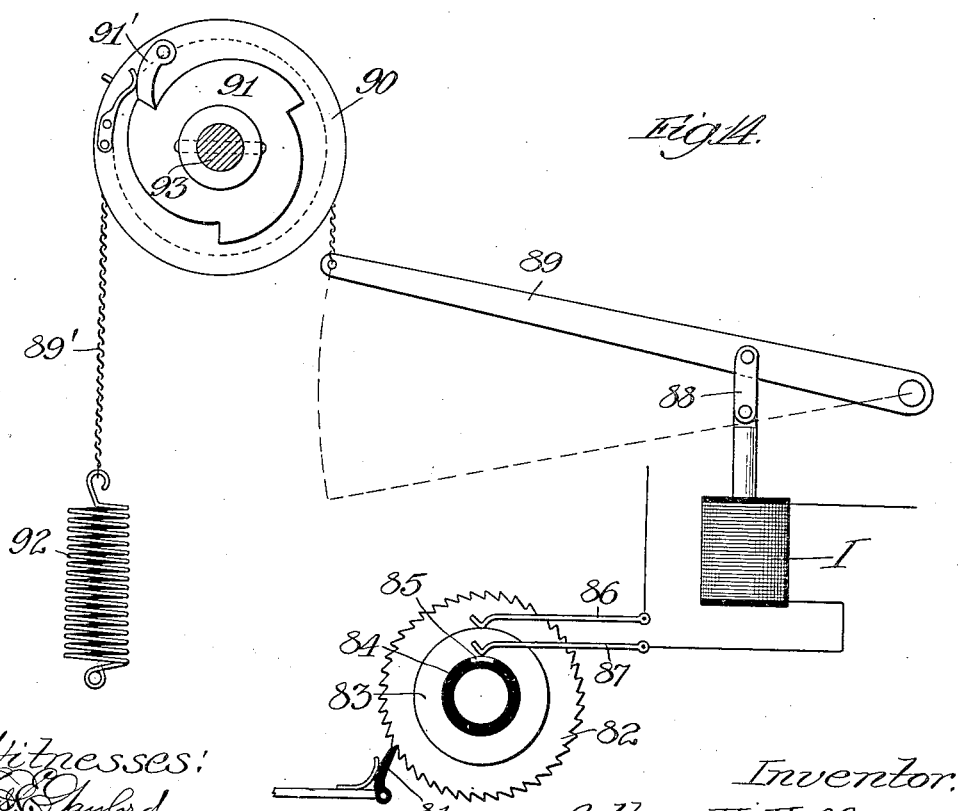

A. H. HOFFMAN.
CHARGING REGULATOR FOR STORAGE BATTERIES.
APPLICATION FILED MAY 1, 1916.

UNITED STATES PATENT OFFICE.

ARTHUR H. HOFFMAN, OF AMES, IOWA.

CHARGING-REGULATOR FOR STORAGE BATTERIES.

1,273,490.  Specification of Letters Patent.  Patented July 23, 1918.

Application filed May 1, 1916. Serial No. 94,704.

*To all whom it may concern:*

Be it known that I, ARTHUR H. HOFFMAN, a citizen of the United States, residing at Ames, in the county of Story and State of Iowa, have invented a new and useful Improvement in Charging-Regulators for Storage Batteries, of which the following is a specification.

My invention relates to improvements in storage battery charging devices, and more particularly to a means for regulating the charging of a storage battery from a variable speed generator. The specific embodiment of the invention hereinafter described has been particularly designed for the charging of storage batteries from a generator driven by wind power. The invention will be more fully understood from the following detailed description of this specific embodiment, taken in connection with the accompanying drawings, in which—

Figure 1:
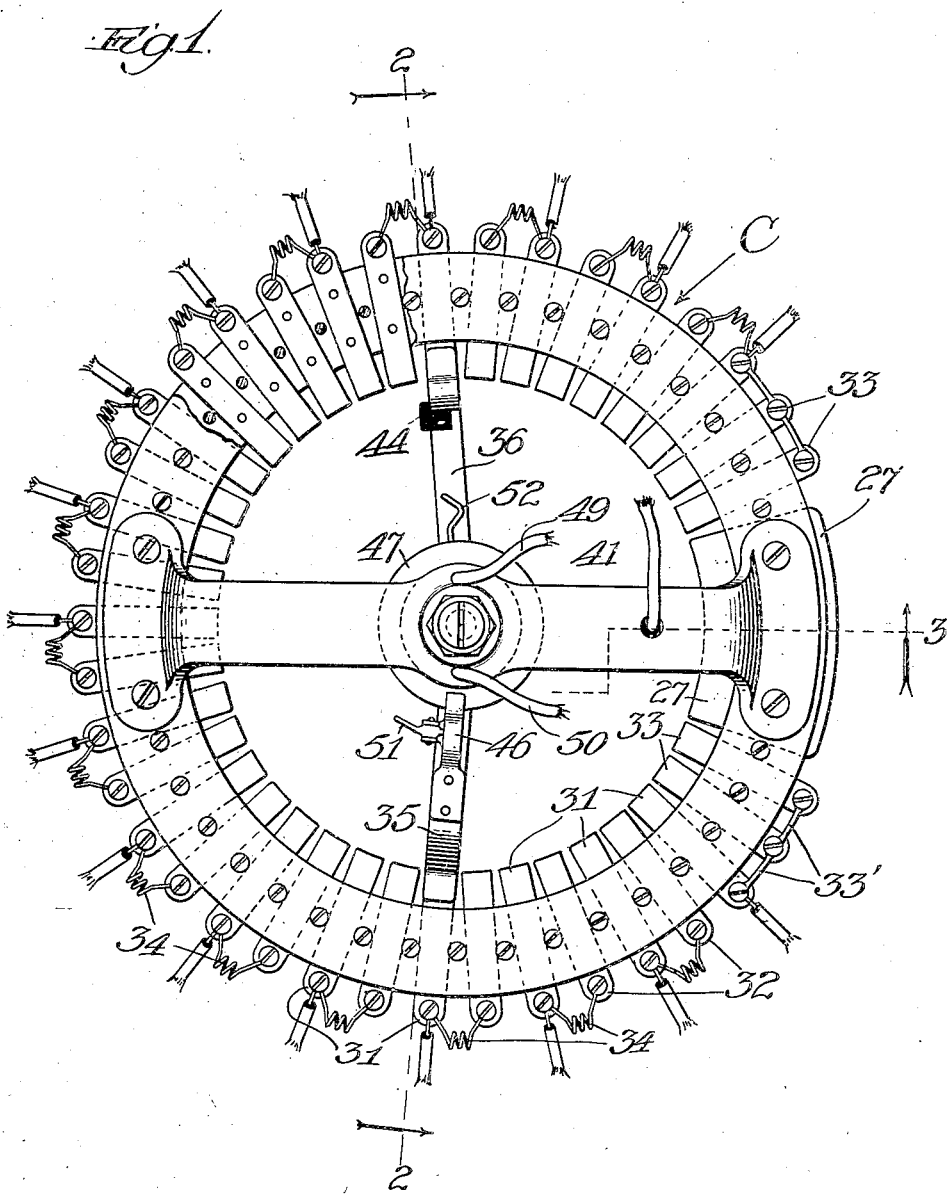

Figure 1 is a plan view of the distributer proper, showing the two movable charging contactors and the circle of contacts through which electrical connection is established with the cells of the battery to be charged, part of the annulus of insulating material over the contacts being broken out. Fig. 2 is a vertical section through the frame of the machine, taken on the line 2 of Fig. 1. Fig. 3 is a section of the upper end of the frame, taken on the line 3 of Fig. 1. Fig. 4 is a section on the line 4 of Fig. 3, showing the reversing switch in elevation. Fig. 5 is a section on the line 5 of Fig. 3 and showing the reversing switch in plan. Fig. 6 is a section on the line 6 of Fig. 2. Fig. 7 is a section on the line 7 of Fig. 2. Fig. 8 is an enlarged broken sectional view taken on the line 8 of Fig. 3. Fig. 9 is a section on the line 9 of Fig. 8. Fig. 10 is an enlarged broken plan view of the upper contactor. Fig. 11 is an enlarged broken plan view of the lower contactor, together with its bearing. Fig. 12 is a broken sectional view of the cell-group interchanging switch, taken as indicated by the line 12 in the diagram of Fig. 15. Fig. 13 is a section on the line 13 of Fig. 12. Fig. 14 is a section on the line 14 of Fig. 12, showing the means for operating the interchanging switch, and Fig. 15 is a diagram showing the electrical connections of the complete device.

Figure 15:
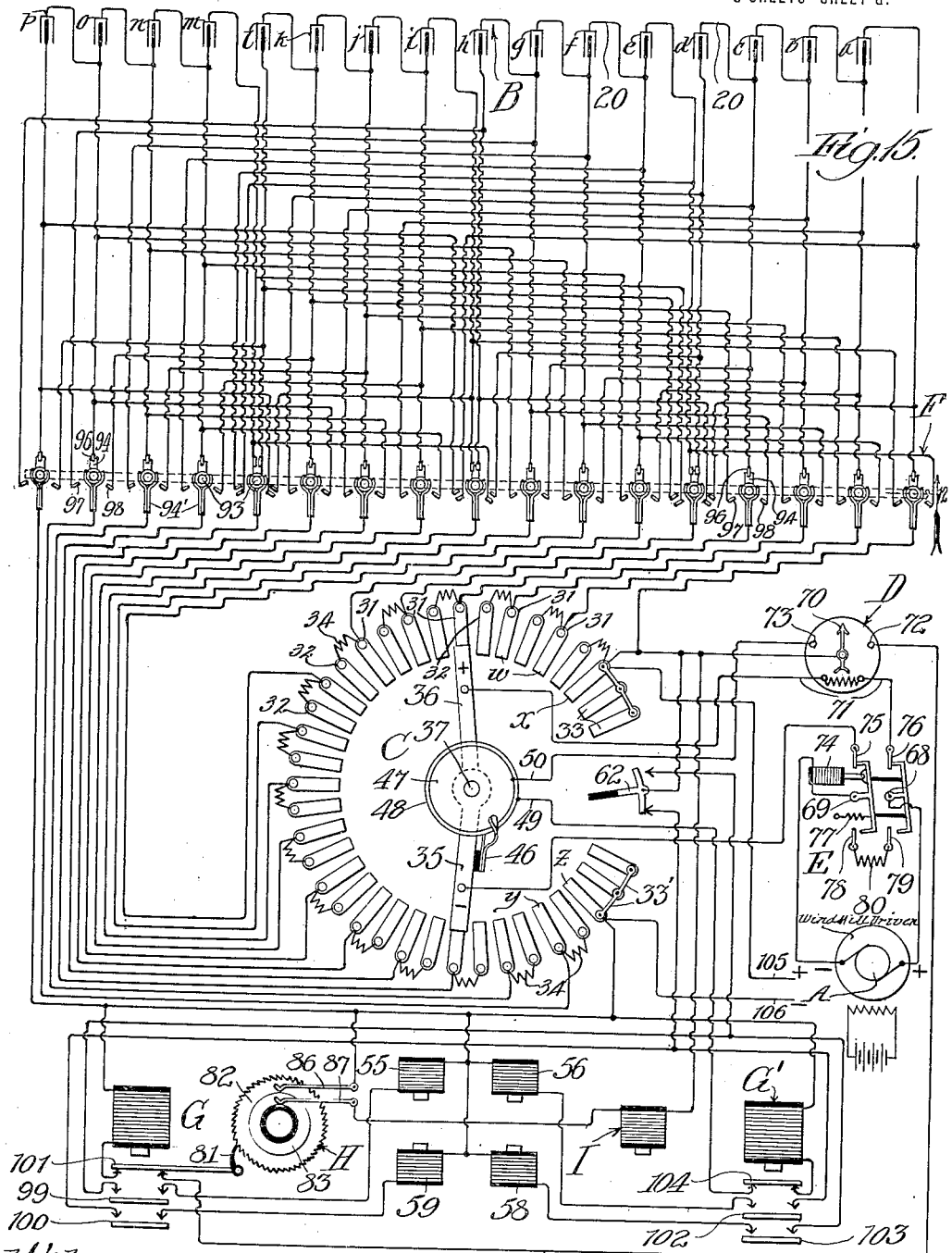

Referring first to Fig. 15 in the drawings, the letter A designates a direct current generator of such type as to maintain a substantially constant field strength through the operative ranges of charging speeds, for instance a series wound generator having its field so proportioned as to become saturated under the minimum operative charging current, a separately excited generator or, preferably, a magneto generator. The generator is to be driven by a variable source of power, for instance, a wind-mill (not shown), B designates a plural cell storage battery, the cells, $a$, $b$, $c$, $d$, etc., of which are arranged in any number of equal group units 20. In the present embodiment of my invention each group or unit is made up of a single cell, sixteen one-cell groups being illustrated. As will later appear, it is necessary that the number of groups or units 20 be divisible by four, for the purpose of the particular cell-group-interchanging switch here described. It will be understood that the several groups 20 of cells are connected in series ready for use as a source of power at all times, except during the momentary operation of the cell-group-interchanging switch, as will later appear.

The letter C in Fig. 15 designates the distributer proper of my invention. The mechanical construction and arrangement of the parts of this portion of the mechanism is illustrated in Figs. 1 to 11. Referring to these figures, the numeral 30 designates a suitable frame having an upper annular head which carries a set of stationary insulated contacts arranged radially and at equal angular intervals. For purposes of description these contacts may be divided into three groups, *i. e.*, main contacts 31 in number equal to the number of cell groups 20 plus 1, each contact 31 normally having electrical connection through the cell-group-interchanging switch (later described) with a group 20 of battery cells. Paired with each of the main contacts 31 are auxiliary contacts 32, each connected to its companion main contact by a suitable resistance 34. This feature of the construction is well understood in the art, by reason of its analogy to the devices used for preventing short circuiting or open circuiting when operating end-cell switches. The third species of contact-members comprises the end contacts 33, two of which are arranged adjacent each of the end main contacts 31, and joined thereto as by the connections $33^1$. Each of the end main contacts 31 becomes therefore, in effect, a continuous contact of three times the angular interval of the other contacts.

Movable with respect to and in engagement with the circle of contacts are two movable charging-contactors 35 and 36 carried, respectively, by a shaft 37, and a concentric sleeve 38. The sleeve 38 is carried on the shaft 37 by upper and lower ball-bearings 39 (Fig. 8), while the shaft itself is supported at the ends by cup-and-cone bearings 40. The lower bearing cup 40 is borne by a screw secured directly in the frame 30, while the upper cone bearing 40 is formed by a screw secured in a yoke 41 bridging the upper end of the frame. The two contactors 35 and 36 are each properly insulated from the supporting shaft and sleeve, the usual slip-ring 42 and brush 43 being employed to bring current to the contactor 36 and from the contactor 35. The contactor 36 carries a block of insulating material 44 (Figs. 1 and 2), on its side adjacent the contactor 35 to prevent accidental metallic contact between these members. Contactor 35 carries on its upper surface a piece of insulating material 45 (Figs. 8 and 9) to which is fastened a double-leaf spring contact-device 46, the two tips of which engage with and normally make electrical connection between two metal disks 47 and 48, properly insulated from each other and from the bridge 41 which carries them on its under side. The disk 47 has a wire 49 and the disk 48 a wire 50, by means of which they are included within the electrical circuits of the apparatus, as will later appear. The lower leaf of the spring 46 carries a pair of ears between which is pivoted a bent lever 51 (Fig. 9), the horizontal end of which bears against the lower face of the upper leaf 46. Arranged in the path of movement of the depending end of the lever 51 there is a hook 52 carried in the hub-portion of the contactor 36, so that by engagement of the depending end of the lever with the hook the former will be oscillated to spring apart the leaves of the double contact 46, and thereby break connection of one or both of the leaf ends with the disks 47, 48.

The shaft 37 and sleeve 38 each carry a pair of oppositely set ratchet-wheels 53 and 54, which are rigidly secured to their respective arbors. The teeth of the two wheels 54 are designed to give counter-clockwise rotation, and those of the two wheels 53 counter-clockwise rotation to the shaft 37 and sleeve 38, and through the latter members to the swinging contactors 35 and 36, respectively. The angular pitch of the ratchet-teeth of the wheels 53 and 54 is the same as the angular spacing of the main contacts 31. For operating the ratchet-wheels 53, 54 of the sleeve there are provided electro-magnets 56, 55, which operate pawls $56^1$, $55^1$ engaging with the ratchet-teeth. Similarly electro-magnets 58 and 59, operating through pawls $58^1$ and $59^1$ give clockwise and counter-clockwise rotation, respectively, to the shaft 37. To limit positively the angular movement of the ratchet-wheels for each throw of the pawls, dogs 60 (Figs. 6 and 7) are arranged to engage over a tooth of the other and oppositely set wheel of the pair attached to the same moving part, each dog 60 being operated by a pin 61 carried by the armature of the respective magnet and traveling in a slot in the dog. The armature of each of the magnets 55, 56, 58 and 59 is by action of a spring $106^1$ restored to rest position when deënergized. By the same agency also its ratchet $55^1$, $56^1$, $58^1$, or $59^1$ is drawn up on stop 107 thus permitting free rotation of ratchet wheels 53 and 54 in either clockwise or counter-clockwise direction.

A single pole double-throw switch 62 (Figs. 3, 4 and 5), so constructed as to be thrown by relatively light force, is carried on a suitable supporting bracket of the frame 30 in such position that an insulated arm 63 projects into the path of movement of the contactors between the end contacts 33, the arrangement being such that when a contactor 35 or 36 approaches the end contact toward which the switch-arm 63 projects, it strikes the latter, and by movement to the extreme position its impact imparts sufficient motion to the switch-arm to cause the latter to swing over the center and close the circuit at its opposite pole.

Referring again to the diagram (Fig. 15) D designates a direct current ammeter of suitable range, having its indicating needle 70 insulated from its main circuit 71 and having an auxiliary contact 72 in position to be engaged by the needle 70 when the latter reaches a position indicative of a predetermined maximum current value, and a second auxiliary contact 73 with which the needle 70 engages when the charging current drops to a predetermined minimum value.

In series with the main circuit 71 of the ammeter, as will later appear, there is a circuit breaker and restorer E, which, while charging current is flowing, is held by a series magnet 74 in position to close the circuit at the points indicated 75 and 76, and by drop of the current to a predetermined minimum value, is drawn by a spring 77 out of contact with the points 75 and 76 and into engagement with points 78, 79, which are connected through a resistance 80.

Referring again to Fig. 15, G designates a slow-acting relay constructed to interrupt its own circuit at 101 when its armature is attracted, so that its operation will be repeated so long as the energizing voltage is maintained. Its function is to close two circuits at 99 and 100 (Fig. 15) and to rotate, step by step, the cell-group-interchanging switch magnet circuit closer H. This rotation of the circuit closer is accomplished by means of a pawl 81 (of insulating material) (Fig. 14) engaging the teeth of a ratchet-wheel 82 which carries a metal slip-ring 83 and a cylinder 84 of insulating material having flush with its surface a segment 85 of metal electrically connected with the slip-ring 83. A brush 86 constantly engages the slip-ring 83 and a brush 87 bearing upon the cylinder surface 84 makes contact once each revolution with the segment 85.

A relay $G^1$ similar to the relay G, but having no ratchet device associated therewith, opens its own circuit by the movement of its armature 104, and by the same movement closes additional circuits at 102 and 103 for operating the contactor magnets, as will later appear. The cell-group-interchanging switch *per se* is operated by a magnet I, the electrical connections of which are shown in Fig. 15 and the mechanical connections of which are shown in Fig. 14. Referring to the latter figure, the magnet-plunger is attached by a link 88 to a lever 89, the free end of which is connected to a length of chain $89^1$ traveling in a grooved wheel 90 loosely mounted upon the shaft 93 of the cell-group-interchanging switch. A three-toothed ratchet-wheel 91 pinned to the shaft 93 lies adjacent one face of the free wheel 90, in position to be engaged by a spring-held pawl $91^1$ carried by the latter. The chain transmits motion to the loose wheel 90 by reason of the fact that it is pinned thereto at one point. In the arrangement shown in the drawing, the energizing of the magnet I causes the loose wheel 90 to move in the clockwise direction, the pawl traveling freely over the ratchet-wheel. When the magnet is deënergized, a spring 92, to which the opposite end of the chain is attached, oscillates the wheel 90 in a counter-clockwise direction, in which movement the pawl engages the ratchet and thereby rotates the shaft 93.

As shown in Figs. 12, 13 and 15, the shaft of the cell-group-interchanging switch carries a plurality of wipers 94, the wipers being in number equal to the main contacts 31, and each wiper in regular order having electrical connection by means of a brush $94^1$, and slip-ring 95, with its respective main contact 31. The wipers 94 are insulated from one another and from the shaft 93, each wiper being arranged to make contact selectively with three sets of stationary contacts designated 96, 97, 98, disposed at 120° intervals, conforming to the spacing of the teeth of the ratchet-wheel 91.

The relays G and $G^1$ and the contactor-operating magnets 55, 56, 58 and 59 each have one coil terminal permanently connected to the negative service line 106 of the battery. All of these magnets and relays are energized through devices which bring current to them from the positive service wire 105 of the battery, by the connections shown in Fig. 15, as will later appear.

The operation of the apparatus is as follows:

Whenever charging is desired, the apparatus is left connected and ready to operate automatically in case the wind (assuming that the generator is operated from a wind-mill) should rise sufficiently. This does not interfere, in any way, with the use of the full voltage or current of the entire battery on the service lines 105, 106, which are at all times ready for use, whether charging is taking place or not, nor does any loss or continued use of battery energy by the switching device itself, or by any of its parts, result from leaving the device connected up and ready to charge. Further, any ordinary type of end-cell switch may be attached and used if desired. If after the battery has been given the customary overcharge, as for example, after long continued strong wind, it is desired to cease charging, the charging circuits may be opened, or, if it is not desired to use the mill for any other purpose, it may be furled.

The armature circuit of the generator A (Fig. 15) is at all times connected through the series magnet 74 with middle terminals 68 and 69 of the circuit breaker and closer E. When the armature speed is too low to charge even a single group or unit of the battery cells, E is closed by its spring 77, through contacts 78 and 79 which are connected by a resistance 80 of any appropriate value. The generated current, if any, flows through the solenoid 74 and resistance 80 until the generated voltage and hence the current has arisen to a predetermined value, which value depends on the type of cells used and the number in a group or unit. A regulation of this current value may be secured by adjustment of the parts of the circuit-breaker and closer E. When the proper voltage to start charging of one unit of the battery is reached, E is closed automatically by the operation of the solenoid 74 to form contact at 75 and 76, and is held closed in this position so long as the charging current remains at or above the predetermined minimum value. The positive charging current then flows from the positive brush of the generator A through 76, thence through the main circuit 71 of the current-regulating ammeter D, thence through the positive contactor 36 of the distributer C, and by way of the main contact 31, with which the contactor is then in engagement, through the cell-group-interchanging switch F, through the single group of cells 20 which was last charging when the wind failed, back through F, and by way of a second main contact 31 to the negative contactor 35, through the contactor and from the connections of the latter through E by way of contact 75 and coil 74 to the negative brush of the generator. It should be noted that in normal operation contactors 35 and 36 are invariably left on a pair of adjacent main contacts 31 when for any cause charging ceases.

If now the generator speed increases until the charging current reached a predetermined maximum value, the ammeter needle 70 will engage the contact 72, and by reason of the needle being connected with the positive side of the battery, as indicated in the diagram, the includer relay G, which is connected with the negative service wire of the battery, will be energized, and will operate to close at 99 the circuit of the magnet 55 and at 100 the circuit of the magnet 59, one or the other of these magnets being thereby energized according to the position of the reversing switch 62. Thus, in Fig. 15, the switch being in the position shown, the magnet 59 will be energized, the positive side of the circuit of the magnet 55 being held open by the reversing switch. When magnet 59 is energized, the shaft 37 carrying the contactor 35 is rotated in a counter-clockwise direction through the angular distance of one tooth of the ratchet-wheel, that is, over an auxiliary contact 32 and on to the next adjacent main contact 31, thus causing the inclusion of a charging unit into the charging circuit. If the inclusion of the additional unit into the charging circuit fails to lower the value of the charging current below the maximum at which the ammeter hand is held in contact at 72 (as in the case of rapid acceleration of the speed of the generator) the relay G will again function as described, to cause the contactor 35 to include one or more additional units in the charging circuit, the relay G operating and the contactor 35 progressively adding units to the charging circuit until the charging current is brought below the predetermined value and the ammeter hand swings backwardly from the contact 72.

Likewise, if the inclusion of a single unit as the generator speed accelerated proved sufficient to reduce the charging current below the predetermined value, and after some time the continued acceleration of the generator brought the current above this value, the controlling ammeter will automatically function to close the relay circuit, as is required for the maintenance of a charging current not exceeding the predetermined value.

If at any time during the operation described above the current should fall to a predetermined minimum value, the ammeter needle 70 will swing backward to make contact at 73, and thereby energize through the connections shown in diagram the relay $G^1$ which I call the excluder relay, closing through the bars 102, 103 the circuits of the excluder magnets 56 and 58, only one of which will be operative, as determined by the position of the reversing switch 62. In the positions of the parts shown in the drawing, the excluder magnet 56 will be operated by such energizing of the relay $G^1$, causing the sleeve 38 carrying the positive contactor 36 to be rotated one step in a counter-clockwise direction, causing the exclusion of the battery group or unit of cells which has been charging longest. By reason of the fact that the relay $G^1$ interrupts its own circuit at 104, the operation of the relay is repeated again and again until the energizing voltage is discontinued by movement of the ammeter needle off of contact 73, or until the number of cell-groups between the charging contactors is reduced to one, that is to say, until the contactor 36 has approached contactor 35 until it is on the main contact 31 next adjacent to the one in engagement with the latter contactor. Under this condition the circuit of the excluder relay $G^1$ will be opened by the double-leaf spring 46, the ends of which will be forced apart by reason of the engagement of the depending end of the bent lever 51 with the hook 52. With the circuit of the excluder relay $G^1$ thus opened, there will be no further energizing of the relay, and hence no attempt to exclude the single battery unit still charging should the current fall and needle 70 again make contact with 73. The single unit would continue to charge until the current fell to the very low predetermined value at which the series magnet 74 of the circuit breaker and closer E would allow the spring 77 to open the charging circuit at 75 and 76, and close the generator circuit through the resistance 80, under which circumstances the whole device would be in the condition originally described and ready again to cut in and charge when the generator speed rises sufficiently.

The charging contactor 35 will continue to act as an includer of unit after unit whenever the rise of the current causes the ammeter needle 70 to engage the contact 72, until the contactor 35 reaches the last main contact 31 in its counter-clockwise rotation. When the current thereafter rises sufficiently to call for another inclusion, the contactor 35 will be moved to extreme end position on the second of the extra contacts 33 next to an insulating stop 27 which is interposed between the end contacts 33 of the two ends of the battery (Fig. 1), meanwhile striking the insulated handle 63 of the reversing switch 62, to throw the latter to the opposite position, and thereby cause contactors 35 and 36 to interchange functions, the connections being such that 36 now acts as an includer and 35 as an excluder. Since the movement of 35 on to the extra contact 33 does not include a cell group, such movement will not affect the charging current, consequently the includer relay G will still have the energizing voltage upon it. Since the circuit of this relay like that of the excluder relay $G^1$ is intermittently made and broken so long as energizing voltage is present, G will at once cause electro-magnet 55 to be energized, thereby operating contactor 36 which is now the includer, to move the latter in a clockwise direction, to cause it to include one or more units. When the contactor 36 in turn has reached its position of extreme clockwise rotation, reversing switch 62 again operates to cause contactors 35 and 36 to interchange functions.

If at any time during the charging, the generator current suddenly drops to zero, as, for example, by the breaking of a wire, the excluder relay will operate repeatedly until only one unit remains between the contactors, at which time the circuit of excluder relay $G^1$ will be opened and all of the parts will again be ready to operate when the break has been repaired and the generator started.

The purpose of the extra contacts 33 is to render it possible for the contactors to have an end group of cells left between them when charging ceases, thus improving the chances of an end group getting an amount of charging more nearly like that enjoyed by other groups.

Since, especially in the case of a wind able to charge about half the cell group units at once, the units connected to the middle main contacts would receive more frequent charging, and therefore in the course of a week or month more ampere-hours than the groups attached to the main contacts near the ends, it is desirable to employ some means of equalizing the charge for all groups. I prefer to use the following means for accomplishing this purpose: I connect each main contact 31 by a wire to a brush $94^1$ which rubs on the slip-ring 95 integral with the wiper 94 of the cell-group-interchanging switch (Figs. 12, 13 and 15). When the wipers are in the position shown diagrammatically in Fig. 15, in engagement with contacts 96, the electrical connections run straight through to the cell-groups, so that the group on the extreme right will be connected between main contacts $w$ and $x$ (Fig. 15), and that on the extreme left between main contacts $y$ and $z$, with the intervening groups connected in regular order between them. By means of the two sets of cross-connections shown in Fig. 15 as connected to the two additional sets of stationary contacts 97 and 98 of the cell-group-interchanging switch, when the wipers 94 engage with the stationary contacts 97, the battery is, in effect, cut into halves and the halves interchanged so that the former end groups of cells now become middle groups, and vice versa. When the wipers 94 are rotated into engagement with the stationary contacts 98, the battery is, in effect, cut into fourths by the second set of cross-connections, and re-connected so that the two quarters in each half of the battery are interchanged with respect to the stationary contacts of the distributer C.

When contactors 35, 36, and cell-group-interchanging switch F have positions as shown in Fig. 15, the positive charging current flows through the cell groups being charged in the order $d, e, f, g, h, i, j, k, l, m$, through intervening connecting wires.

With all connections as shown in Fig. 15 the cell groups are connected for service all in series in order as follows (positive end) $a, b, c, d, e, f, g, h, i, j, k, l, m, n, o, p$ (negative end).

When contactors 35, 36 are in positions shown in Fig. 15 but switch F rotated so each wiper is engaging its stationary contact 98, the positive charging current flows through the cell groups being charged in the order $h, a, b, c, d, m, n, o, p, i$, through intervening cross-connecting wires.

With connections as in Fig. 15 except switch F rotated to have each wiper 94 engage its respective contact 98 the cell groups are connected for service all in series in order as follows through intervening connecting wires (positive end) $e, f, g, h, a, b, c, d, m, n, o, p, i, j, k, l$.

The shaft 93 of the cell-group-interchanging switch F is operated to move the wipers 94 into engagement with the three sets of stationary contacts of the switch by the armature of the relay G, which is provided with the pawl 81 operatively related to the ratchet-wheel 82. Once in each revolution of the latter member, corresponding to a predetermined number of operations of the relay G, the circuit is closed between the brushes 86, 87, thereby energizing the solenoid I, by which latter the switch shaft 93 is rotated through 120°.

By adjustment of the relative position of contacts 72 and 73 with respect to each other, the frequency of operation of includer and excluder relays may be adjusted to suit the wind conditions prevalent in any particular place and as may be required by the number of the cell units in the battery.

For use in my charging device I prefer to employ a generator so designed that its voltage at the maximum speed (as determined by the governing out or automatic furling of the wind-mill) will never exceed the open circuit voltage of the battery.

While I have shown and described in considerable detail one specific embodiment of my invention, it is to be understood that this showing and description is illustrative only, and for the purpose of making clear the nature of the invention, and that I do not regard the invention as limited to such details, nor to any of them, except in so far as such limitations are included within the terms of the following claims, in which it is my intention to claim all novelty inherent in my invention as broadly as is permissible, in view of the prior art.

What I claim as new and desire to secure by Letters Patent, is:

1. In combination, a variably driven charging generator, a plural unit battery, means for including progressively within the charging circuit unit after unit of the battery in proportion to increase of the charging current, and means for progressively excluding from the charging circuit with decrease in the charging current the unit or units which have been longest in the said circuit.

2. In combination, a variably driven charging generator, a plural unit battery, contacts connected with the units of the battery, a movable contactor, means controlled by increase of the charging current for causing the contactor to progress over the said contacts to include progressively the units of the battery within the charging circuit, a second movable contactor, and means actuated by decrease of the charging current for causing the last named contactor to follow the first named contactor to exclude progressively from the charging circuits the units which have been longest in the said circuit.

3. In combination, a variably driven charging generator, a plural unit battery, contacts connected with the units of the said battery, a movable contactor for coöperating therewith, a second movable contactor arranged to follow the first contactor, a current-meter responsive to changes in the charging current, and means controlled by said current-meter for moving said first contactor progressively over the said contacts to include progressively the units of the battery within the charging circuit with increase of charging current, and for causing the said second named contactor to follow said first named contactor to exclude progressively from the charging circuit the units which have been longest in the said circuit, by decrease of the charging current.

4. In combination, a variably driven charging generator, a plural unit battery, contacts connected with the units of the said battery, a movable contactor for coöperating therewith, a second movable contactor arranged to follow the first contactor, a current meter responsive to changes in the charging current, an electro-magnet for moving said first named contactor with a step-by-step motion over the said contacts to include progressively within the charging circuit the units of the battery, means for energizing said magnet by movement of said current-meter with increased current, a second electro-magnet for causing said second contactor to follow said first contactor to exclude progressively the units which have been longest charging, and means for controlling said second magnet by movement of said meter with decreased current.

5. In combination, a variably driven charging generator, a plural unit battery, contacts connected with the units of the battery and arranged in arcuate line, a swinging contactor pivoted concentrically of the line of contact for movement thereover, a second swinging contactor pivoted concentrically with said first contactor, means controlled by increase of charging current for progressively moving said first contactor to include unit after unit of the battery within the charging circuit, and means controlled by decrease of the charging current to cause said second contactor to follow said first contactor to exclude progressively from the charging circuit the units which have been longest charging.

6. In combination, a variably driven charging generator, a plural unit battery, contacts connected with the units of the said battery, a movable contactor for coöperating therewith, a second movable contactor arranged to follow the first contactor, a current-meter responsive to changes in the charging current, an includer relay, and excluder relay, contact devices associated with the said meter for actuation under maximum and minimum current flows and in circuit, respectively, with said relays, an includer magnet energized by said includer relay for moving said first contactor, and an excluder magnet energized by said excluder relay for moving said second contactor.

7. In combination, in a self contained automatically operating battery charging system, a plural unit battery to be charged, means for progressively including within the charging circuit unit after unit of the battery in response to the increase of the charging current, means for progressively excluding unit after unit of the battery from the charging circuit in response to decrease of the charging current, a single variable speed driving and power means, and a charging generator the field of which under the conditions of operation specified remains of substantially constant strength.

8. In combination, in a self contained automatically operating battery charging system, a plural unit battery to be charged, means for progressively including within the charging circuit unit after unit of the battery in response to the increase of the charging current, means for progressively excluding unit after unit of the battery from the charging circuit in response to decrease of the charging current, a single variable speed driving and power means, and a charging generator of the magneto type.

9. In combination, a variably driven charging generator, a plural unit battery, contacts connected with the units of the said battery, a movable contactor for coöperating therewith for progressively including within the circuit unit after unit of the battery as the charging current increases, a second movable contactor arranged to follow the first contactor for progressively excluding from the circuit unit after unit as the charging current decreases, and means operable by movement of the first named contactor to its extreme position for interchanging the functions of the two contactors.

10. In combination, a variably driven charging generator, a plural unit battery, contacts connected with the units of the battery and arranged in an arcuate line, an oscillating contactor pivoted concentrically of the line of contacts for movement thereover, a second oscillating contactor pivoted concentrically with said first named contactor, means controlled by increase of charging current for progressively moving said first contactor to include unit after unit of the battery within the charging circuit, means controlled by decrease of the charging current to cause said second contactor to follow said first contactor to exclude progressively from the charging circuit the units which have been longest charging, and means operable by movement of the first named contactor to its extreme position for interchanging the functions of the two contactors.

11. In combination, a charging generator, a plural unit battery to be charged thereby, a cell-group-interchanging switch interposed in the charging circuit, a plurality of connections from the switch to the battery, whereby at different positions of the switch the units of the battery will be interchanged, and means controlled by the predetermined number of increases charging current for actuating said switch.

12. In combination, a variably driven generator, a plural unit battery, a plurality of contacts connected with the units of the battery, a movable contactor arranged to travel over the said contacts to include progressively the units of the battery within the charging circuit, electrically-controlled means operable by increase of charging current for effecting such including movement; a second contactor arranged to follow the first contactor to exclude progressively the units of the battery, electrically controlled means operable by decrease of the charging current for effecting such excluding movement, and means operable by approach of the excluder contactor within a predetermined distance from the includer contactor for opening the electrically-controlled circuit of the former.

13. In combination, a plural unit battery to be charged, means for including progressively within the charging circuit unit after unit of the battery in response to the increase in the charging current, means for excluding the units progressively in response to decrease in the charging current, a single variable speed driving and power means having a predetermined upper speed limit, and a charging generator driven thereby and proportioned to give a charging potential at maximum speed not exceeding the open circuit voltage of the maximum number of cells in series.

ARTHUR H. HOFFMAN.